United States Patent
Weber

[11] 3,965,725
[45] June 29, 1976

[54] SOUNDING VIBROMETER
[75] Inventor: Philippe Weber, Fontainebleau, France
[73] Assignee: Agence Nationale de Valorisation de la Recherche (ANVAR), France
[22] Filed: Aug. 14, 1974
[21] Appl. No.: 497,494

[30] Foreign Application Priority Data
Aug. 14, 1973 France .............. 73.29710

[52] U.S. Cl. .................. 73/71.4; 340/17 R
[51] Int. Cl.² ............... G01N 9/18; G01D 7/00
[58] Field of Search .......... 340/17; 73/67, 69, 70, 73/71.4, 84, 522, 526

[56] References Cited
UNITED STATES PATENTS
3,065,456  11/1962  Alexander .................. 340/17
3,709,031  1/1973  Wilson et al. ............... 73/84
3,713,127  1/1973  Keledy et al. ............... 73/67

Primary Examiner—Richard A. Farley
Assistant Examiner—T. M. Blum
Attorney, Agent, or Firm—Craig & Antonelli

[57] ABSTRACT

A sounding vibrometer which is characterized in that it comprises a sensor comprising a geophone with its test-lead point mounted by way of a plurality of cable-type damping devices on small columns rigidly attached to a plate affixed to a tubular section of a segmented rod.

9 Claims, 6 Drawing Figures

SOUNDING VIBROMETER

BACKGROUND OF THE INVENTION

Field of the Invention

The present invention relates to a sounding vibrometer and, more particularly, to a portable, self-contained device for detecting, measuring and indicating the particulate speed in a rock mass.

SUMMARY OF THE INVENTION

The device according to the invention comprises two separate parts: firstly the sensor per se with its handling rod and secondly the electrical box; these two parts being interconnected by way of a flexible electric wire. The invention will be described with reference to the following figures which are provided by way of non-limitative examples only.

DESCRIPTION OF THE PREFERRED EMBODIMENT

Figure 1:
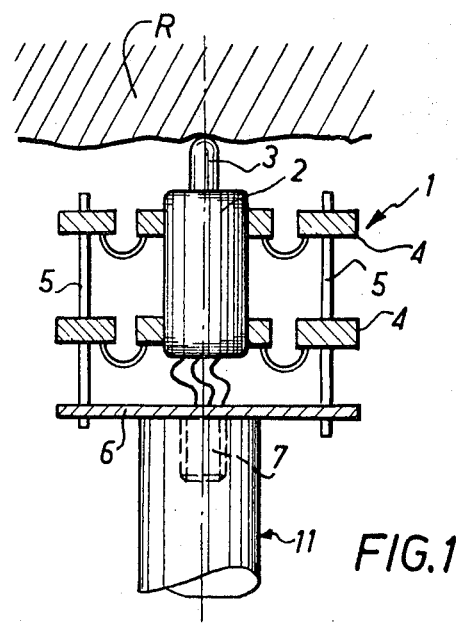
FIG. 1 is a diagrammatic view of the sensor.
Figure 2:
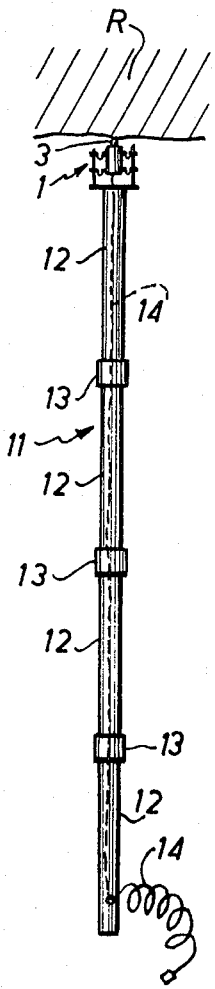
FIG. 2 shows the assembly of the sensor on its rod.

With reference to FIG. 1: the sensor 1 per se comprises a geophone 2 with its test-lead point mounted by way of two cable type damping devices 4 on three or four small columns 5 rigidly attached to a plate 6 by means of a screw 7. With reference to FIG. 2: the rod 11 which is made of zicral or fiber glass consists of four tubular sections 12 adapted to be snapped together by way of three connections 13 (bayonet type or automatic connections) so as to obtain a rod which is 1.50 m, 3m, 4.5 m, or 6m in length as desired. The unit only has to bear a force in the order of 2kg by weight which is necessary to rest the test-lead point 3 on the rock mass R. The electric wires 14 of the geophone pass through the rod 11 which they leave at its lower part. These wires are preferably incorporated in tubes 12. The connections 13 safeguard the electrical connections and the lead out wire consists of extensible wire (the type of wire used for telephone sets).

Figure 3:
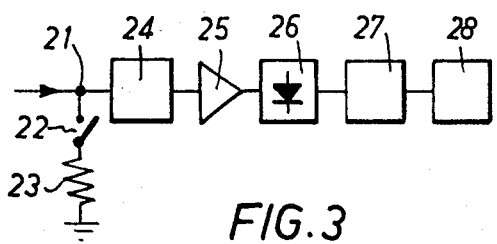
FIG. 3 is a block diagram of the electrical part.
Figure 4:
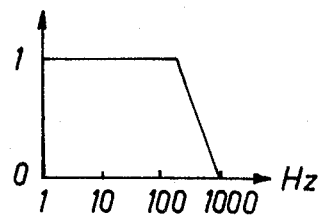
FIG. 4 is a graph of the response of the low-pass filter shown in FIG. 3.
Figure 5:
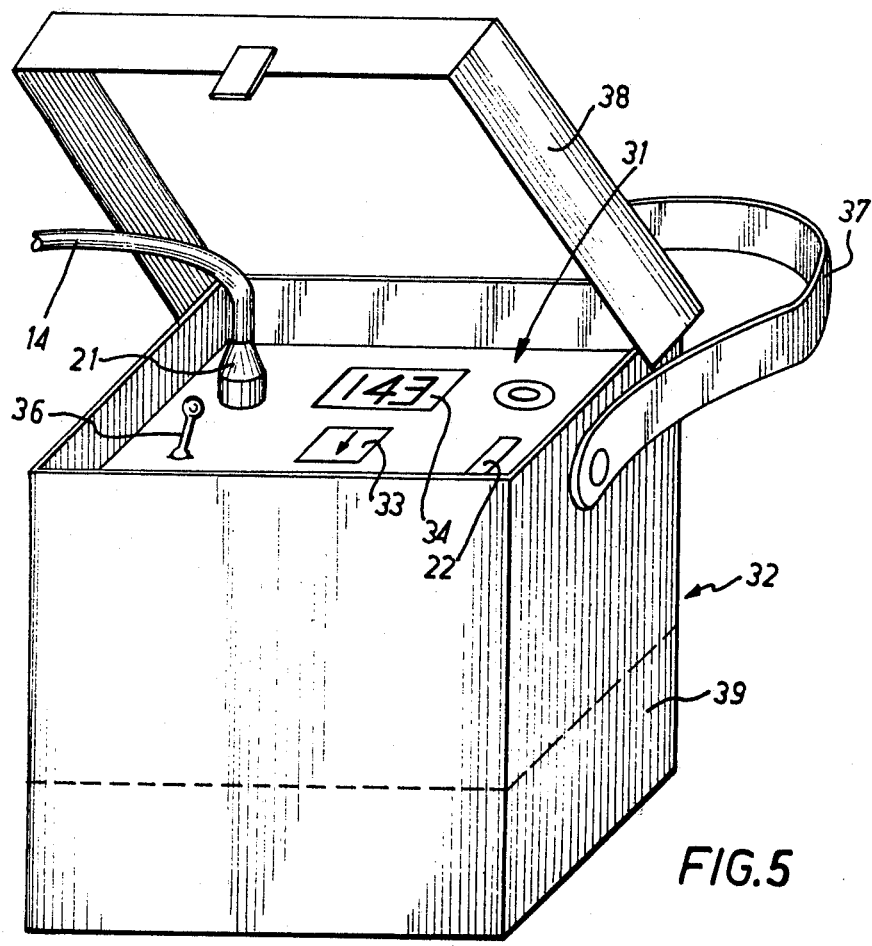
FIG. 5 is a perspective view of the electrical box.
Figure 6:
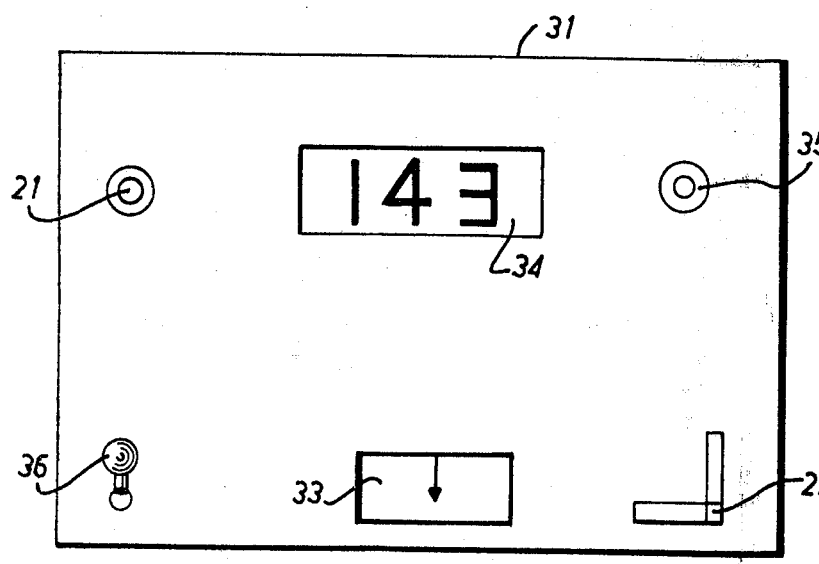
FIG. 6 shows the side panel of the box shown in FIG. 5.

With reference to FIG. 3, which is the block diagram of the electrical part: the input signal 21 which may be damped by means of a switch 22 in series with a resistance 23, for example, of a 200 ohm resistor connected to ground, is applied to a low-pass filter 24 with an input impedance of at least 5 kΩ. The filter is designed to eliminate the high frequencies produced at the contact point of the test-lead point 3 and the rock mass R. This low-pass filter possesses, for example, an attenuation from 450 Hz of 12 decibels per octave - as shown in the graph of FIG. 4. The low-pass filter 24 is followed by an amplifier 25 having an adjustable gain. This is followed by a rectifier 26 and then a converter 27 which effects the analog-digital conversion, for example, at a conversion rate of $10^4$ pulses per sec. per volt. The converter 27 drives an integrator-indicator 28 which indicates a number N proportional to the integral:

$$\int_0^{t_0} |v(t)| dt$$

where $v(t)$ is the particulate speed of the rock mass as detected by the geophone and $t_0$ is the total duration of the vibration. With reference to FIGS. 5 and 6: the side panel 31 of the box 32 comprises — apart from the input 21 and the switch 22— an indicator 33 indicating the state of the cells, a data indicator 34, a zero resetting knob 35 and a stop-start switch 36. The data indicator 34 is designed for 3 characters of the seven segment type each character being at least 6 mm in height and clearly visible one meter away. The return-to-zero knob 35 triggers a time delay of, for example, 5 seconds, during which the letters are illuminated and it is possible to read the same. The supply to the data indicator is then interrupted. In the case of an overrun, the data indicator stops at 999 which indicates this overrun. The box 32, which is provided with a carrying strap 37 and a cover 38, holds in its lower part 39 cells (not represented) or batteries (not represented) adapted to be recharged by means of a mains charger.

Purely by way of indication, with a battery permitting automatic operation for two or three hours, the box can measure 8 × 12 × 20 cm and weigh approximately 1500 grams.

What is claimed is:

1. A sounding vibrometer for measuring the particulate speed in a rock mass comprising: a sensor including a geophone having its test-lead point mounted by way of two cable-type damping devices on small columns rigidly attached to a plate by means of a screw which is screwed onto a tubular section of a zicral or fiber glass rod, the tubular section being connected to three other sections by means of three bayonet or automatic connections, and an electrical circuit comprising an input with a switch and damping shunt resistance, a low-pass filter, an adjustable gain amplifier, a rectifier, an analog-digital converter, and an integrator-indicator which indicates a number proportional to the integral of the modulus of the particulate speed of said rock mass as detected by the geophone during the duration of a vibration.

2. A vibrometer as claimed in claim 1, characterized in that the wires leaving the geophone are incorporated in the tubular sections, the connections ensuring the electrical connections and the lead-out section of the wires consisting of extensible wire.

3. A vibrometer as claimed in claim 1, characterized in that the low-pass filter has an attenuation of 12 decibels per octave from 450 Hz.

4. A vibrometer according to claim 1, characterized in that the converter operates at a conversion rate of $10^4$ pulses per second per volt.

5. A vibrometer according to claim 1, characterized in that the electrical circuit is contained in a box, the side panel of which comprises — in addition to said input and said switch — an indicator showing the state of the cells, a data indicator, a zero resetting knob and a stop-start switch, the return-to-zero knob triggering a time delay circuit supplying said data indicator, for example, for 5 seconds.

6. A vibrometer as claimed in claim 2, characterized in that the low-pass filter has an attenuation of 12 decibels per octave from 450 Hz.

7. A vibrometer according to claim 6, characterized in that the converter operates at a conversion rate of $10^4$ pulses per second per volt.

8. A vibrometer according to claim 7, characterized in that the electrical circuit is contained in a box, the side panel of which comprises — in addition to said input and said switch — an indicator showing the state of the cells, a data indicator, a zero resetting knob and a stop-start switch, the return-to-zero knob triggering a time delay circuit supplying said data indicator for a predetermined period of time.

9. A sounding vibrometer for measuring the particulate speed in a rock mass comprising:
- a sensor including a geophone having its test-lead point mounted by means of plural damping devices to a plurality of columns rigidly attached to a plate connected to a light weight rod formed of a plurality of connectable sections so as to obtain a rod of varying length; and
- an electrical circuit for receiving an output of the geophone including an input with a switch and damping shunt resistance, a low-pass filter, an adjustable gain amplifier, a rectifier, an analog-digital converter, and an integrator-indicator which displays a number proportional to the integral of the modulus of the particulate speed of said rock mass as detected by the geophone during the duration of a vibration.

\* \* \* \* \*